(No Model.)

C. N. BRADY.
COVER FOR FRUIT JARS OR OTHER VESSELS.

No. 529,239. Patented Nov. 13, 1894.

Witnesses:
J. B. McGirr.
Archie H. Reese

Inventor:
Charles N. Brady,
by Frank L. Dyer,
Attorney

UNITED STATES PATENT OFFICE.

CHARLES NEAVE BRADY, OF WASHINGTON, PENNSYLVANIA.

COVER FOR FRUIT-JARS OR OTHER VESSELS.

SPECIFICATION forming part of Letters Patent No. 529,239, dated November 13, 1894.

Application filed March 17, 1894. Serial No. 504,085. (No model.)

*To all whom it may concern:*

Be it known that I, CHARLES NEAVE BRADY, a citizen of the United States, residing at Washington, in the county of Washington and State of Pennsylvania, have invented certain new and useful Improvements in Covers for Fruit Jars or other Vessels; and I do hereby declare the following to be a full, clear, and exact description of the invention, which will enable others skilled in the art to which it appertains to make and use the same.

My invention relates to various new and useful improvements in fruit jar covers.

The object of the invention is to provide a cover for fruit jars or other vessels for containing fruit, milk or other articles by means of which such goods may be put up for shipment or preservation while cold. Ordinarily, fruit and vegetables, in being preserved, are placed in cans or jars, which are then heated so as to drive off the air therefrom. After the air has been driven off in this way the jars or cans are sealed so as to prevent air from entering and spoiling the contents. This method of preserving fruit and vegetables is not only inconvenient and expensive but the results obtained are frequently unsatisfactory.

By using a cover embodying the ideas of my invention for a fruit jar or other vessel for containing fruit or vegetables to be preserved, such fruit or vegetables may be placed in the jar while cold, and when thus preserved will keep perfectly fresh for a long time.

Broadly considered, my invention consists in making a cover for a fruit jar, or other vessel, of glass, porcelain, metal, or other suitable material, having an opening therein for introducing the material into the jar or other vessel, and a smaller opening therein to allow the air within such vessel to be expelled therefrom, such openings being adapted to be closed or sealed in any suitable way after the jar or other vessel has been entirely filled and all the air has been removed therefrom. I shall claim hereinafter the broad idea of a cover for fruit jars or other vessels, embodying these features and I shall also claim several important specific details of construction which I have invented.

For a better comprehension of my invention, attention is directed to the accompanying drawings, forming a part of this specification, and in which—

Figure 1:
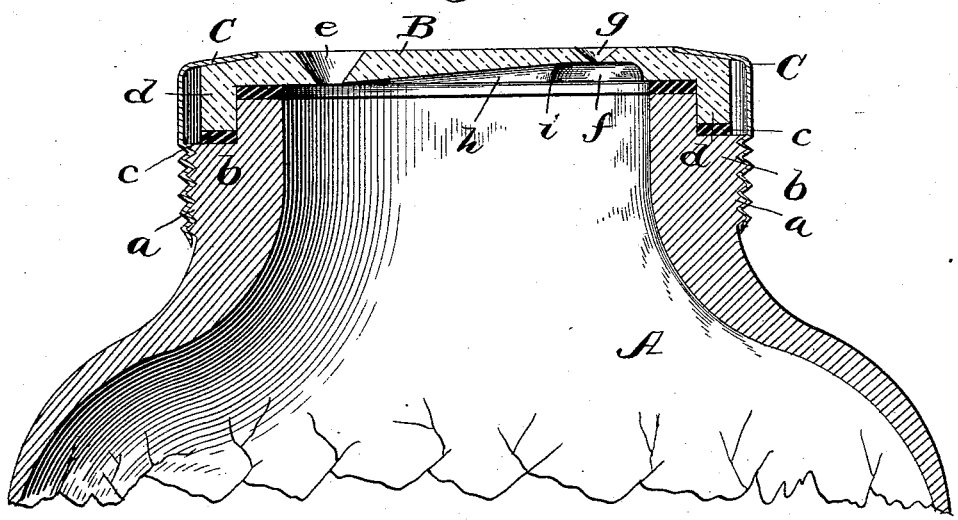
Figure 2:
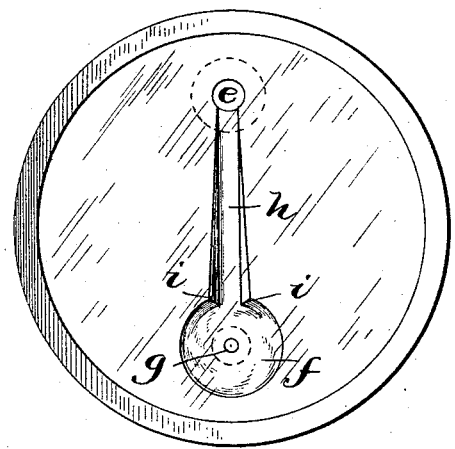

Figure 1 is a sectional view of my improved cover, shown in place on a fruit jar of well known construction; and Fig. 2, a bottom view thereof.

In both views corresponding parts are designated by the same letters of reference.

A, is a fruit jar of any desired construction, that shown being the well known Mason improved jar. This fruit jar is provided with threads $a$, on the exterior of its neck, and with a seat $b$, on the neck above the threads $a$. Upon this seat $b$, is generally placed a gasket or rubber ring $c$, for making a tight joint with the cover, having a depending annular flange $d$, which bears on the rubber ring or gasket $c$.

C, is a metal cap, provided with screw threads, which cap engages with the threaded neck of the jar and is screwed down so as to force the annular flange $d$, of the cover firmly against the rubber ring or gasket $c$.

I do not claim this fruit jar, nor anything in connection therewith, nor do I wish to be limited to the use of my improved cover with such a fruit jar, since the same ideas which I have in mind may be carried out with any other variety of fruit jar, or with any other vessel for containing fruit or vegetables, such as ordinary tin cans.

The cover B, is made preferably of glass, but it may be made of any other desired material, such as porcelain or metal. When the cover B, is to be used with a fruit jar like that illustrated, it is generally provided with the depending annular flange $d$, before referred to, but this flange is not new, is unimportant, and I do not wish to be limited to the same unless specifically claimed.

The cover B, is provided with a hole $e$, extending entirely through the cover and flared as shown, its upper portion being of larger diameter than its lower portion. On the under side of the cover, preferably on a diametric line with the hole $e$, is a circular recess or depression $f$, and extending up from the center of this circular recess or depression is a smaller hole $g$, which serves as a vent, and which is also preferably flared like the hole $e$, but this is not necessary. Extending on the under side of the cover from the hole $e$, to the said recess or depression $f$, is a channel $h$, gradually increasing in depth from the hole $e$, to the said recess or depression. This channel, in entering the said recess or depression, will generally but not always form small shoulders $i$.

I make use of my improved cover for fruit jars or other vessels in the following way: The jar or other vessel is filled nearly to the top with fruit or other vegetables, which are generally first cooked with or without sugar and which may be cold. The cover B, is now placed on the jar or other vessel and is screwed or is otherwise held in place in any suitable way. Any suitable liquid, preferably the juice of the fruit or vegetable to be preserved, or water or alcohol, is now poured into the opening $e$, so as to entirely fill the jar or other vessel. As this liquid is being poured into the jar or other vessel, the air therein will be forced out through the opening or vent $g$. By making use of the recess or depression $f$, and the connecting channel $h$, all the air from within the vessel or jar will be expelled through the opening $g$, without the danger of the formation of air bubbles. When the liquid which is thus poured into the jar or vessel has reached to the level of the bottom of the hole $g$, it is obvious that all air has been expelled therefrom, and all that now remains is to seal up the openings $e$ and $g$, with any suitable material, such as wax or paraffine and it will be ready for shipment. The sealing material thus applied to the holes $e$ and $g$, may be protected in any way, if desired, such as by a flat disk placed over the cover and held thereon in any suitable way. Having by this means filled the jar entirely with the material to be preserved and having expelled all air therefrom, it is evident that there can be no decomposition whatever of the material within the jar.

Having now described my invention, what I claim as new therein, and desire to secure by Letters Patent, is as follows:

1. An improved cover for fruit jars or other vessels, provided with a flared opening $e$ for the entrance of a liquid within the jar or other vessel, with a depression or recess $f$, in the bottom of the cover, with an opening $g$, extending up from said recess or depression for the exit of air from within the jar or other vessel, and with a channel $h$, extending from the opening $e$, into the said recess or depression, for the purpose mentioned, substantially as described.

2. An improved cover for fruit jars or other vessels, made of glass with a depending annular flange $d$, with the opening $e$, with the depression or recess $f$, with the opening $g$, extending up from said recess or depression, and with the channel $h$, connecting the opening $e$ with said recess or depression, substantially as described.

3. An improved cover for fruit jars or other vessels, provided with a flared opening $e$, for the entrance of a liquid within the jar or other vessel, with a depression or recess $f$, in the bottom of the cover, with an opening $g$, extending up from said recess or depression for the exit of air from within the jar or other vessel, and with a channel $h$, extending from the opening $e$, in the cover to the said recess or depression, said channel gradually increasing in depth from the opening $e$, to the said recess or depression for the purpose mentioned, substantially as described.

In testimony whereof I affix my signature in presence of two witnesses.

CHARLES NEAVE BRADY.

Witnesses:
JOHN W. DORMAN,
MINNIE A. LEONARD.